US008619854B2

(12) United States Patent  (10) Patent No.: US 8,619,854 B2
Choi et al.  (45) Date of Patent: Dec. 31, 2013

(54) SCALABLE VIDEO ENCODING AND DECODING METHOD USING SWITCHING PICTURES AND APPARATUS THEREOF

(75) Inventors: Hae-Chul Choi, Daejeon (KR); Jae-Gon Kim, Daejeon (KR); Jin-Woo Hong, Daejeon (KR); Hae-Kwang Kim, Seoul (KR); Jie Jia, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 517 days.

(21) Appl. No.: 12/294,633

(22) PCT Filed: Mar. 27, 2007

(86) PCT No.: PCT/KR2007/001505
§ 371 (c)(1),
(2), (4) Date: Feb. 17, 2009

(87) PCT Pub. No.: WO2007/111473
PCT Pub. Date: Oct. 4, 2007

(65) Prior Publication Data
US 2011/0150084 A1  Jun. 23, 2011

Related U.S. Application Data

(60) Provisional application No. 60/786,268, filed on Mar. 27, 2006, provisional application No. 60/816,582, filed on Jun. 26, 2006, provisional application No. 60/816,784, filed on Jun. 27, 2006.

(30) Foreign Application Priority Data

Mar. 27, 2007 (KR) .................. 10-2007-0030009

(51) Int. Cl.
*H04N 7/12* (2006.01)
(52) U.S. Cl.
USPC .................................................. 375/240.12
(58) Field of Classification Search
USPC ............. 375/240.01–240.29; 714/746, 776
See application file for complete search history.

(56) References Cited

U.S. PATENT DOCUMENTS 5,771,081 A    6/1998  Lee
6,480,541 B1 * 11/2002  Girod et al. .............. 375/240.12
(Continued)

FOREIGN PATENT DOCUMENTS

KR       2005-0022160 A     3/2005
KR      1020050076019 A     7/2005

OTHER PUBLICATIONS

Walter, Michael "Advanced Bitstream Switching for Wireless Video Streaming" Diploma thesis, Munich University of Technology, Dec. 2004. http://www.Int.ei.tum.de/mitarbeiter/liebl/students/MichaelWalter_Diplomarbeit.pdf.*

(Continued)

*Primary Examiner* — Tung Vo
*Assistant Examiner* — Stephen Smith
(74) *Attorney, Agent, or Firm* — Ladas & Parry LLP

(57) ABSTRACT

A conventional new video coding technology can provide a bitstream switching picture by encoding the bitstream switching picture into an I picture. However, an encoding efficiency is greatly reduced. As such, the new video coding technology does not provide an efficient bitstream switching function. Also, other advantages provided by a switching picture technology such as a random access, error durability, and a bitstream splicing are not provided. Provided is an apparatus for encoding a video bitstream including a base layer bitstream and an enhancement layer bitstream by encoding an enhancement layer picture of the enhancement layer bitstream, which is reproduced immediately after a base layer picture of the base layer bitstream is reproduced, into a non-switching pictures by interlayer prediction using a reference image generated by decoding a pre-encoded base layer picture or by motion prediction using another reference image generated by decoding a pre-encoded enhancement layer picture, and into a switching picture, which is decoded into the same image as the non-switching picture, by an interlayer prediction using the non-switching picture and a reference image generated by decoding a pre-encoded base layer picture, while the base layer picture is being reproduced.

19 Claims, 13 Drawing Sheets

(56) References Cited

U.S. PATENT DOCUMENTS

| | | | |
|---|---|---|---|
| 6,640,248 | B1 | 10/2003 | Jorgensen |
| 6,765,963 | B2 | 7/2004 | Karczewicz et al. |
| 7,106,796 | B2 | 9/2006 | Seo |
| 2003/0151753 | A1* | 8/2003 | Li et al. .......................... 358/1.9 |
| 2004/0114684 | A1* | 6/2004 | Karczewicz et al. .... 375/240.03 |
| 2005/0117641 | A1* | 6/2005 | Xu et al. ................... 375/240.08 |
| 2005/0147164 | A1* | 7/2005 | Wu et al. ................... 375/240.12 |
| 2006/0088094 | A1* | 4/2006 | Cieplinski et al. ........ 375/240.01 |
| 2007/0073779 | A1* | 3/2007 | Walker et al. .............. 707/104.1 |
| 2007/0206673 | A1* | 9/2007 | Cipolli et al. .............. 375/240.1 |

OTHER PUBLICATIONS

Chang et al., "R-D Optimized Quantization of H.264 SP-Frames for Bistream Switching under Storage Constraints", Circuits and Systems, 2005. ISCAS 2005. IEEE International Symposium on, May 2005, vol. 2, pp. 1242-1245.*

M.Karczewicz et al;"The SP- and SI-Frames Design for H.264/AVC",Circuits and Systems for Video Technology, IEEE Transactions on vol. 13, Issue 7, Jul. 2003, pp. 637-644.

M. Karczewicz, et al;"Improved SP-frame encoding", ITU-T video coding experts group meeting, Austin, USA, Apr. 2001.

X Sun, et al; "The Improved SP Frame Coding Technique for the JVT Standard", Image Processing, 2003, Proceedings, 2003 International, pp. 497-500.

M.Karczewicz, et al; "The SP Frames Design for JVT/H.26L", Image Processing, 2002, International, Synchronization-predictive coding for video compression.

International Search Report mailed Jul. 5, 2007; PCT/KR2007/001505.

\* cited by examiner

FIG. 3

I$_{h1}$ P$_{h2}$ P$_{h3}$ P$_{h4}$ P$_{h5}$ P$_{h6}$ P$_{h7}$ P$_{h8}$ ......... <HIGH QUALITY VIDEO BITSTREAM>

I$_{l1}$ P$_{l2}$ P$_{l3}$ P$_{l4}$ P$_{l5}$ P$_{l6}$ P$_{l7}$ P$_{l8}$ ......... <LOW QUALITY VIDEO BITSTREAM>

FIG. 4

I$_{h1}$ P$_{h2}$ P$_{h3}$ P$_{h4}$ P$_{h5}$ P$_{h6}$ P$_{h7}$ P$_{h8}$ ......... <ENHANCEMENT LAYER VIDEO BITSTREAM>

I$_{l1}$ P$_{l2}$ P$_{l3}$ P$_{l4}$ P$_{l5}$ P$_{l6}$ P$_{l7}$ P$_{l8}$ ......... <BASE LAYER VIDEO BITSTREAM>

$I_{h1}$ $P_{h2}$ $P_{h3}$ $P_{h4}$ $SP_{h5}$ $P_{h6}$ $P_{h7}$ $P_{h8}$ ......... <HIGH QUALITY VIDEO BITSTREAM>

$SP_{ns5}$ <SWITCHING PICTURE>

$I_{l1}$ $P_{l2}$ $P_{l3}$ $P_{l4}$ $P_{l5}$ $P_{l6}$ $P_{l7}$ $P_{l8}$ ......... <LOW QUALITY VIDEO BITSTREAM>

SCALABLE VIDEO ENCODING AND DECODING METHOD USING SWITCHING PICTURES AND APPARATUS THEREOF

TECHNICAL FIELD

The present invention relates to a scalable video encoding/reproducing method using switching pictures and an apparatus thereof, and more particularly, to a method and apparatus for performing an interlayer reproduction conversion between a base layer bitstream and an enhancement layer bitstream in which a scalable video coding (SVC) technology is adopted.

BACKGROUND ART

In general, video data is compressed to be stored or transmitted due to its large data size and the compressed video data is decoded so as to be reproduced.

FIG. 1 is a diagram illustrating a conventional video compression method.

Referring to FIG. 1, video compression is performed in units of still images included in video data.

In terms of a compression method, an original input image may be compressed by using a P/B frame method in which temporal redundancy is removed by motion prediction and motion compensation using a reference image, or an I frame method in which the image is directly compressed not by using the motion vectors.

In block-based video compression, an image is divided into macroblocks and sub-blocks and then is compressed by performing motion prediction in block units.

In the I frame method, the original image is compressed by discrete cosine transform (DCT), quantization and entropy encoding and is stored into a buffer by inverse quantization and inverse discrete cosine transform (IDCT) so as to be used as a reference image when a temporal redundancy of P and B frames is removed by motion prediction.

In the P/B frame method, the motion prediction and the motion compensation are performed on the original input image using the stored reference image and a difference image between the original image and the reference image is obtained. Then, the difference image is compressed by DCT, quantization, and entropy encoding and motion vectors are encoded.

The above-described image compressed by using the P/B frame method may be stored as a reference image for an image to be input later by inverse quantization and IDCT and by being combined with a motion-compensated reference image.

For the motion prediction and the motion compensation, one reference image is used in a P frame method and two reference images are used in a B frame method.

FIG. 2 is a diagram illustrating a method of reproducing a bitstream compressed by the method illustrated in FIG. 1.

Text information and motion vectors having losses are input. An I frame is reproduced after being entropy-decoded, inverse quantized and IDCT-converted, and the reproduced image is used as a reference image.

A P or B frame is reproduced by being entropy decoded, inverse quantized, and IDCT-converted, and then motion-compensated by using input motion vectors and the reference image. The reproduced image may be used as a reference image.

Conventional H.264 video coding standards provide a switching picture technology which efficiently allows a method of lossless encoding of a decoded image. The technology includes an encoding technology for a non-switching picture, a SI picture, and a switching picture. One non-switching picture included in a bitstream may be lossless-encoded and switched by a SI picture or a switching picture.

FIG. 3 is a diagram for illustrating a disadvantage of switching picture bitstreams in a conventional H.264 video coding technology.

Video data is compressed into a high quality video bitstream and a low quality video bitstream in IPPPP structure by separately using a video compressor. A user is watching image $P_{l5}$ of the low quality video bitstream being reproduced at a predetermined time point.

In order for the user to continuously watch the video data while changing from low quality video bitstream to high quality video bitstream in accordance with the wishes of the user, the user has to reproduce next image $P_{h6}$ in the high quality video bitstream.

However, in order to reproduce image $P_{h6}$, reference image $P_{h5}$ has to be reproduced and thus, the high quality video bitstream has to be decoded from $I_{n1}$.

FIG. 4 is a diagram for illustrating a disadvantage of switching picture bitstreams in a scalable video coding (SVC) technology.

A video data is compressed into an enhancement layer video bitstream and a base layer video bitstream in IPPPP structure by using a new different video compressor.

Here, P is compressed by using, for example, an interlayer motion prediction and an interlayer texture prediction used for a new video compressing technology.

A user is watching image $P_{l5}$ of the base layer video bitstream being reproduced at a predetermined time point.

In order for the user to continuously watch the video data while changing from low quality video bitstream to high quality video bitstream in accordance with the wishes of the user, the user has to reproduce next image $P_{h6}$ in the enhancement layer video bitstream. However, in order to reproduce image $P_{h6}$, reference image $P_{h5}$ has to be reproduced and thus, the high quality video bitstream has to be decoded from $I_{n1}$.

The above described new encoding technology can provide a bitstream switching picture by encoding the bitstream switching picture into an I picture. However, an encoding efficiency is greatly reduced.

As described above, the new video coding technology does not provide an efficient bitstream switching function. Also, other advantages provided by a switching picture technology such as a random access, error durability, and a bitstream splicing are not provided.

DESCRIPTION OF THE DRAWINGS

FIG. 3 is a diagram for illustrating a disadvantage of switching picture bitstreams in a conventional H.264 video coding technology.

FIG. 4 is a diagram for illustrating a disadvantage of switching picture bitstreams in a scalable video coding (SVC) technology.

DETAILED DESCRIPTION OF THE INVENTION

Technical Problem

Figure 1:
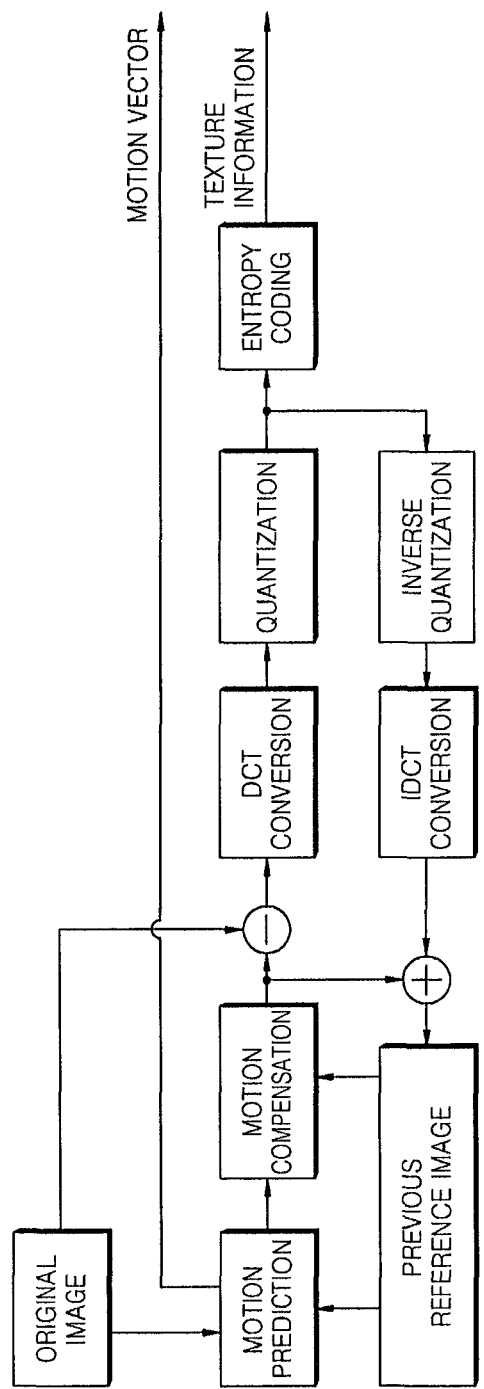
FIG. 1 is a diagram illustrating a conventional video compression method.
Figure 2:
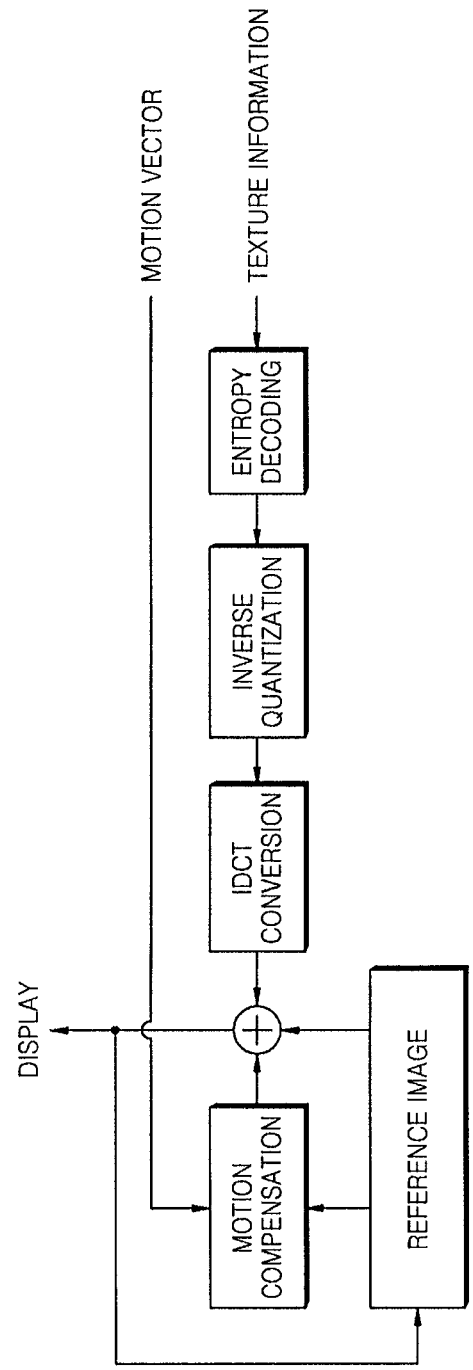
FIG. 2 is a diagram illustrating a method of reproducing a bitstream compressed by the method illustrated in FIG. 1.

The present invention provides various advantages such as efficient bitstream switching, a random access, error durability, and a bitstream splicing to new video data by combining a scalable video coding (SVC) technology and a switching picture technology.

Technical Solution

According to an aspect of the present invention, there is provided an apparatus for encoding a video bitstream including a base layer bitstream and an enhancement layer bitstream by encoding an enhancement layer picture of the enhancement layer bitstream, which can be reproduced immediately after a base layer picture of the base layer bitstream is reproduced, into switching and non-switching pictures, while the base layer picture is being reproduced.

Advantageous Effects

As described above, the present invention provides various functions such as a random access, bitstream switching, fast forward, and fast backward to new video bitstreams by adopting a switching picture technology to a video coding unit.

Best Mode

According to an aspect of the present invention, there is provided an apparatus for encoding a video bitstream including a base layer bitstream and an enhancement layer bitstream, wherein an enhancement layer picture of the enhancement layer bitstream is encoded into switching picture and non-switching picture, wherein, during reproduction of the base layer picture of the base layer bitstream, the enhancement layer picture is able to be reproduced consecutively after one of the reproduced base layer pictures.

The non-switching picture may be encoded by prediction using an original image and a reference image generated by decoding a pre-encoded base layer picture and a pre-encoded enhancement layer picture included in the original image, and the switching picture may be encoded by interlayer prediction using the non-switching picture and a reference image generated by decoding a pre-encoded base layer picture.

The switching and non-switching pictures may be decoded into the same image.

The reference image used for the prediction when the switching picture is encoded may be different from the reference image used for the prediction when the non-switching picture is encoded.

According to another aspect of the present invention, there is provided an apparatus for encoding a non-switching picture in which a base layer bitstream and an enhancement layer bitstream are encoded for interlayer reproduction conversion of an original image to be encoded, wherein the non-switching picture is encoded by prediction using an original image and a reference image generated by decoding a pre-encoded base layer picture and a pre-encoded enhancement layer picture.

The apparatus may include an enhancement layer non-switching picture encoding unit which encodes the non-switching picture by prediction using a reference image reference image generated by decoding a pre-encoded base layer picture or a pre-encoded encoded enhancement layer picture.

The enhancement layer non-switching picture encoding unit may include a motion prediction unit which generates prediction information and a prediction image by using the original image, and the reference image generated by decoding a pre-encoded basic layer picture or a pre-encoded enhancement layer picture; an image conversion unit which generates a bitstream by compressing a residual image which corresponds to the difference between the original image and the prediction image; and a multiplexing unit which combines and outputs a bitstream generated by the image conversion unit and the prediction information.

According to another aspect of the present invention, there is provided an apparatus for encoding a switching picture in which a base layer bitstream and an enhancement layer bitstream are generated for interlayer reproduction conversion of an original image to be encoded by using the base layer bitstream and the enhancement layer bitstream which includes a non-switching picture, wherein a switching picture, which represents the same decoded image as the non-switching picture, is encoded by interlayer prediction using the non-switching picture and a reference image generated by decoding a pre-encoded base layer picture.

The apparatus may include an enhancement layer switching picture encoding unit which encodes the switching picture, which represents the same decoded image as the non-switching picture, in accordance with the interlayer prediction using the base layer picture.

The enhancement layer switching picture encoding unit may include a motion prediction unit which generates prediction information and a prediction image by interlayer prediction using the non-switching picture, and the reference image generated by decoding a pre-encoded base layer picture; an image conversion unit which compresses a residual image which corresponds to the difference between the non-switching picture and the prediction information; and a multiplexing unit which combines and outputs image information generated by the image conversion unit and the prediction information.

According to another aspect of the present invention, there is provided an encoder for encoding a base layer bitstream and an enhancement layer bitstream for interlayer reproduction conversion of an original image to be encoded, the encoder including a non-switching picture encoding unit which encodes the non-switching picture by prediction using an original image and a reference image generated by decoding a pre-encoded base layer picture and a pre-encoded enhancement layer picture.

The non-switching picture encoding unit may include an enhancement layer non-switching picture encoding unit which encodes the non-switching picture by prediction using a reference image generated by decoding a pre-encoded base layer picture or a pre-encoded enhancement layer picture.

The enhancement layer non-switching picture encoding unit may include a motion prediction unit which generates prediction information and a prediction image by using the original image, and the reference image generated by decoding a pre-encoded basic layer picture or a pre-encoded enhancement layer picture; an image conversion unit which generates a bitstream by compressing a residual image which corresponds to the difference between the original image and the prediction image; and a multiplexing unit which combines and outputs a bitstream generated by the image conversion unit and the prediction information.

The encoder may further include a switching picture encoding unit which encodes a switching picture, which represents the same decoded image as the non-switching picture, by interlayer prediction using the non-switching picture and a reference image generated by decoding a pre-encoded base layer picture.

The switching picture encoding unit may include an enhancement layer switching picture encoding unit which encodes the switching picture, which represents the same decoded image as the non-switching picture, in accordance with the interlayer prediction using the base layer picture.

The enhancement layer switching picture encoding unit may include a motion prediction unit which generates prediction information and a prediction image by interlayer prediction using the non-switching picture, and the reference image generated by decoding a pre-encoded base layer picture; an image conversion unit which compresses a residual image which corresponds to the difference between the non-switching picture and the prediction information; and a multiplexing unit which combines and outputs image information generated by the image conversion unit and the prediction information.

According to another aspect of the present invention, there is provided an apparatus for decoding a non-switching picture by decoding a bitstream including switching pictures for interlayer reproduction conversion between a base layer bitstream and an enhancement layer bitstream, wherein, if an enhancement layer picture is to be reproduced while a base layer picture of a base layer bitstream is being reproduced, a non-switching picture included in the enhancement layer bitstream is decoded by using prediction information used when the non-switching picture was encoded.

According to another aspect of the present invention, there is provided an apparatus for decoding a switching picture by decoding a bitstream including switching pictures for interlayer reproduction conversion between a base layer bitstream and an enhancement layer bitstream, wherein, if an enhancement layer picture is to be reproduced while a base layer picture of a base layer bitstream is being reproduced, a switching picture included in an enhancement layer bitstream is decoded by using prediction information used when the switching picture was encoded.

According to another aspect of the present invention, there is provided a decoder for decoding a non-switching picture by decoding a bitstream including switching pictures for interlayer reproduction conversion between a base layer bitstream and an enhancement layer bitstream, wherein the decoder includes a non-switching picture decoding unit which decodes an enhancement layer picture by using a non-switching picture included in the enhancement layer bitstream, if an enhancement layer picture is to be reproduced while a base layer picture of the base layer bitstream is being reproduced.

The decoder may further include a switching picture decoding unit which decodes an enhancement layer picture by using a switching picture included in the bitstream, if the enhancement layer picture is to be reproduced while a base layer picture of the base layer bitstream is being reproduced.

Each of the non-switching picture decoding unit and the switching picture decoding unit may include a motion compensation unit which receives prediction information included in the bitstream and predicts an image to be decoded; and an image reproduction unit which receives residual image information included in the bitstream, adds the prediction image and the residual image information, and generates an image to be reproduced.

According to another aspect of the present invention, there is provided a codec for performing interlayer reproduction conversion between a base layer bitstream and an enhanced layer bitstream, the codec including an encoder which encodes a non-switching picture by predicting an enhancement layer picture to be encoded using a reference image generated by decoding a pre-encoded basic layer picture or a pre-encoded enhancement layer picture, and encodes the enhancement layer bitstream by interlayer prediction using a switching picture which represents the same decoded image as the non-switching picture and a reference image generated by decoding a pre-encoded base layer picture; and a decoder which decodes an enhancement layer bitstream to be reproduced by using a switching picture included in the enhancement layer bitstream, if an enhancement layer picture is to be reproduced while a base layer picture of the base layer bitstream is being reproduced.

The encoder may include a non-switching picture encoding unit which encodes the non-switching picture by prediction using an original image and a reference image generated by decoding a pre-encoded base layer picture and a pre-encoded enhancement layer picture.

The non-switching picture encoding unit may include an enhancement layer non-switching picture encoding unit which encodes the non-switching picture by prediction using a reference image generated by decoding a pre-encoded basic layer picture or a pre-encoded enhancement layer picture.

The enhancement layer non-switching picture encoding unit may include a motion prediction unit which generates prediction information and a prediction image by using the original image, and the reference image generated by decoding a pre-encoded basic layer picture or a pre-encoded enhancement layer picture; an image conversion unit which generates a bitstream by compressing a residual image which corresponds to the difference between the original image and the prediction image; and a multiplexing unit which combines and outputs a bitstream generated by the image conversion unit and the prediction information.

The encoder may further include a switching picture encoding unit which encodes a switching picture, which represents the same decoded image as the non-switching picture, by interlayer prediction using the non-switching picture and a reference image generated by decoding a pre-encoded base layer picture.

The switching picture encoding unit may include an enhancement layer switching picture encoding unit which encodes the switching picture, which represents the same decoded image as the non-switching picture, in accordance with the interlayer prediction using the base layer picture.

The enhancement layer switching picture encoding unit may include a motion prediction unit which generates prediction information and a prediction image by an interlayer prediction using the non-switching picture, and the reference image generated by decoding a pre-encoded base layer picture; an image conversion unit which compresses a residual image which corresponds to the difference between the non-switching picture and the prediction information; and a multiplexing unit which combines and outputs image information generated by the image conversion unit and the prediction information.

The decoder may include a non-switching picture decoding unit which decodes an enhancement layer picture by using a non-switching picture included in the enhancement layer bitstream, if an enhancement layer picture is to be reproduced while a base layer picture of the base layer bitstream is being reproduced; and a switching picture decoding unit which decodes an enhancement layer picture by using a switching picture included in the bitstream, if the enhancement layer picture is to be reproduced while a base layer picture of the base layer bitstream is being reproduced.

Each of the non-switching picture decoding unit and the switching picture decoding unit may include a motion compensation unit which receives prediction information included in the bitstream and predicts an image to be decoded; and an image reproduction unit which receives residual image information included in the bitstream, adds the prediction image and the residual image information, and generates an image to be reproduced.

According to another aspect of the present invention, there is provided a method for encoding a video bitstream including a base layer bitstream and an enhancement layer bitstream, wherein an enhancement layer picture of the enhancement layer bitstream is encoded into switching picture and non-switching picture, wherein, during reproduction of the base layer picture of the base layer bitstream, the enhancement layer picture is able to be reproduced consecutively after one of the reproduced base layer pictures.

According to another aspect of the present invention, there is provided a method of encoding a non-switching picture in which a base layer bitstream and an enhancement layer bitstream are encoded for interlayer reproduction conversion of an original image to be encoded, wherein the non-switching picture is encoded by prediction using an original image and a reference image generated by decoding a pre-encoded base layer picture and a pre-encoded enhancement layer picture.

According to another aspect of the present invention, there is provided a method of encoding a switching picture, in which a base layer bitstream and an enhancement layer bitstream are generated for interlayer reproduction conversion of an original image to be encoded by using the base layer bitstream and the enhancement layer bitstream which includes a non-switching picture, wherein a switching picture, which represents the same decoded image as the non-switching picture, is encoded by interlayer prediction using the non-switching picture and a reference image generated by decoding a pre-encoded base layer picture.

According to another aspect of the present invention, there is provided a method of encoding a base layer bitstream and an enhancement layer bitstream for interlayer reproduction conversion of an original image to be encoded, the method including encoding the non-switching picture by prediction using an original image and a reference image generated by decoding a pre-encoded base layer picture and a pre-encoded enhancement layer picture.

According to another aspect of the present invention, there is provided a method of decoding a non-switching picture by decoding a bitstream including switching pictures for interlayer reproduction conversion between a base layer bitstream and an enhancement layer bitstream, wherein, if an enhancement layer picture is to be reproduced while a base layer picture of a base layer bitstream is being reproduced, a non-switching picture included in an enhancement layer bitstream is decoded by using prediction information used when the non-switching picture was encoded.

According to another aspect of the present invention, there is provided a method of decoding a switching picture by decoding a bitstream including switching pictures for interlayer reproduction conversion between a base layer bitstream and an enhancement layer bitstream, wherein, if an enhancement layer picture is to be reproduced while a base layer picture of a base layer bitstream is being reproduced, a switching picture included in an enhancement layer bitstream is decoded by using prediction information used when the switching picture was encoded.

According to another aspect of the present invention, there is provided a method of decoding a non-switching picture by decoding a bitstream including switching pictures for interlayer reproduction conversion between a base layer bitstream and an enhancement layer bitstream, the method including decoding an enhancement layer picture by using a non-switching picture included in the enhancement layer bitstream, if an enhancement layer picture is to be reproduced while a base layer picture of the base layer bitstream is being reproduced.

According to another aspect of the present invention, there is provided a method of coding for performing interlayer reproduction conversion between a base layer bitstream and an enhanced layer bitstream, the method including encoding a non-switching picture by predicting an enhancement layer picture to be encoded using a reference image reference image generated by decoding a pre-encoded base layer picture or a pre-encoded encoded enhancement layer picture, and encoding the enhancement layer bitstream by interlayer prediction using a switching picture which represents the same decoded image as the non-switching picture and a reference image generated by decoding a pre-encoded base layer picture; and decoding an enhancement layer bitstream to be reproduced by using a switching picture included in the enhancement layer bitstream, if an enhancement layer picture is to be reproduced while a base layer picture of the base layer bitstream is being reproduced.

Mode of the Invention

Figure 5:
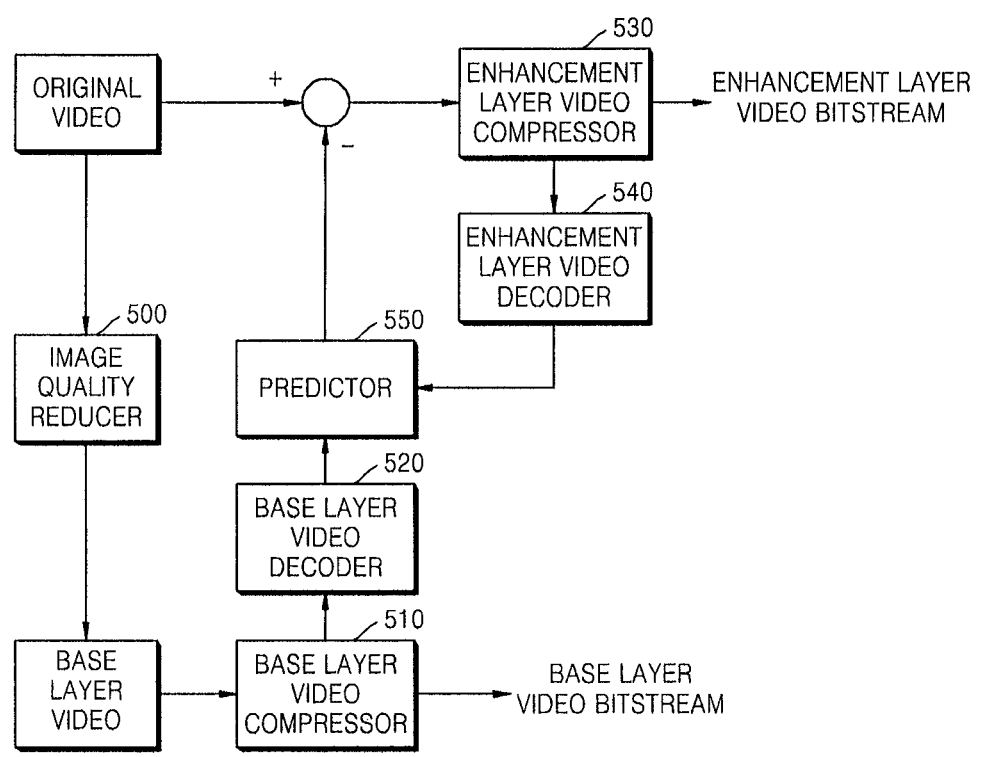
FIG. 5 is a diagram for illustrating a video encoding method according to a conventional SVC technology.

FIG. 5 is a diagram for illustrating a video encoding method according to a conventional scalable video coding (SVC) technology.

Referring to FIG. 5, a video encoder includes an image quality reducer 500, a base layer video compressor 510, a base layer video decoder 520, an enhancement layer video compressor 530, an enhancement layer video decoder 540, and a predictor 550.

MPEG-2 and MPEG-4 video standards and Joint Video Team (JVT) SVC standards, which are currently established, provide a method of encoding scalable video data including a base layer and an enhancement layer and thereby providing an efficient encoding method in order to transmit and reproduce video data by applying different video qualities in accordance with a user's environment.

Original images included in video data to be compressed are generated into base layer images by the image quality reducer 500. The base layer images are compressed by the base layer video compressor 510 and are generated into a base layer video bitstream.

Residual images between the original images and prediction images predicted by the predictor 550 are input to the enhancement layer video decoder 540 and are generated into an enhancement layer video bitstream. The predictor 550 receives information on base layer images compressed by the base layer video compressor 510 and decoded by the base layer video decoder 520, and receives information on enhancement layer images compressed by the enhancement layer video compressor 530 and decoded by the enhancement layer video decoder 540 and predicts the original images.

In the image quality reducer 500, a method such as a down-sampling method or a quantization parameter (QP) method may be used. In the predictor 550, a method such as a motion prediction method or an up-sampling method may be used.

Figures 6, 7:
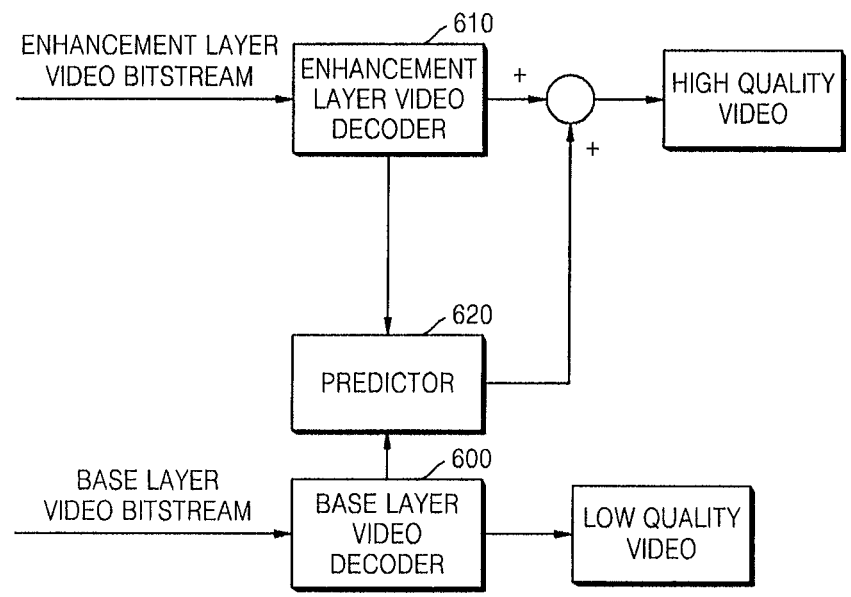
FIG. 6 is a diagram for illustrating a method of decoding the base layer video bitstream and the enhancement layer video bitstream generated as illustrated in FIG. 5.
FIG. 7 is a diagram for illustrating a method of switching picture bitstreams using switching pictures, according to an embodiment of the present invention.

FIG. 6 is a diagram for illustrating a method of decoding the base layer video bitstream and the enhancement layer video bitstream generated by the method illustrated in FIG. 5.

Referring to FIG. 6, a video decoder includes a base layer video decoder 600, an enhancement layer video decoder 610, and a predictor 620.

The base layer video bitstream is decoded by the base layer video decoder 600 and is reproduced as low quality video data.

At the same time, the enhancement layer video bitstream is input to and decoded by the enhancement layer video decoder 610 and then residual images are output. High quality original images are decoded by combining the residual images and prediction images output from the predictor 620.

The predictor 620 outputs the prediction images by using images decoded by the enhancement layer video decoder 610 and images decoded by the base layer video decoder 600.

According to the above-described method, video data may be efficiently compressed such that low quality video data may be reproduced by using only the base layer video bitstream and high quality video data may be reproduced by using both the base layer video bitstream and the enhancement layer video bitstream in accordance with a user environment.

FIG. 7 is a diagram for illustrating a method of switching picture bitstreams using switching pictures, according to an embodiment of the present invention.

A switching picture SPns5 and a non-switching picture SPh5 are encoded at desired locations of low quality and high quality video bitstreams.

Referring to FIG. 7, the non-switching picture SPh5 is encoded with reference to a picture ph4 and the switching picture SPns5 is encoded with reference to a picture Pl5. The switching picture SPns5 and a non-switching picture SPh5 are decoded into the same image. Each of the low quality and high quality video bitstreams may be independently processed and reproduced.

In an example identical to the example illustrated in FIG. 3, a user is watching a picture Pl4 and wishes to continuously watch the next picture of the high quality video bitstream.

Here, the switching picture SPns5 is completely losslessly encoded with reference to the non-switching picture SPh5 and the picture Pl4 of the currently decoded low quality video bitstream.

Accordingly, the user may watch the picture Pl4 and the switching picture SPns5, and then continuously watch high quality video data by decoding a picture Pl6 with reference to the switching picture SPns5.

Figure 8:
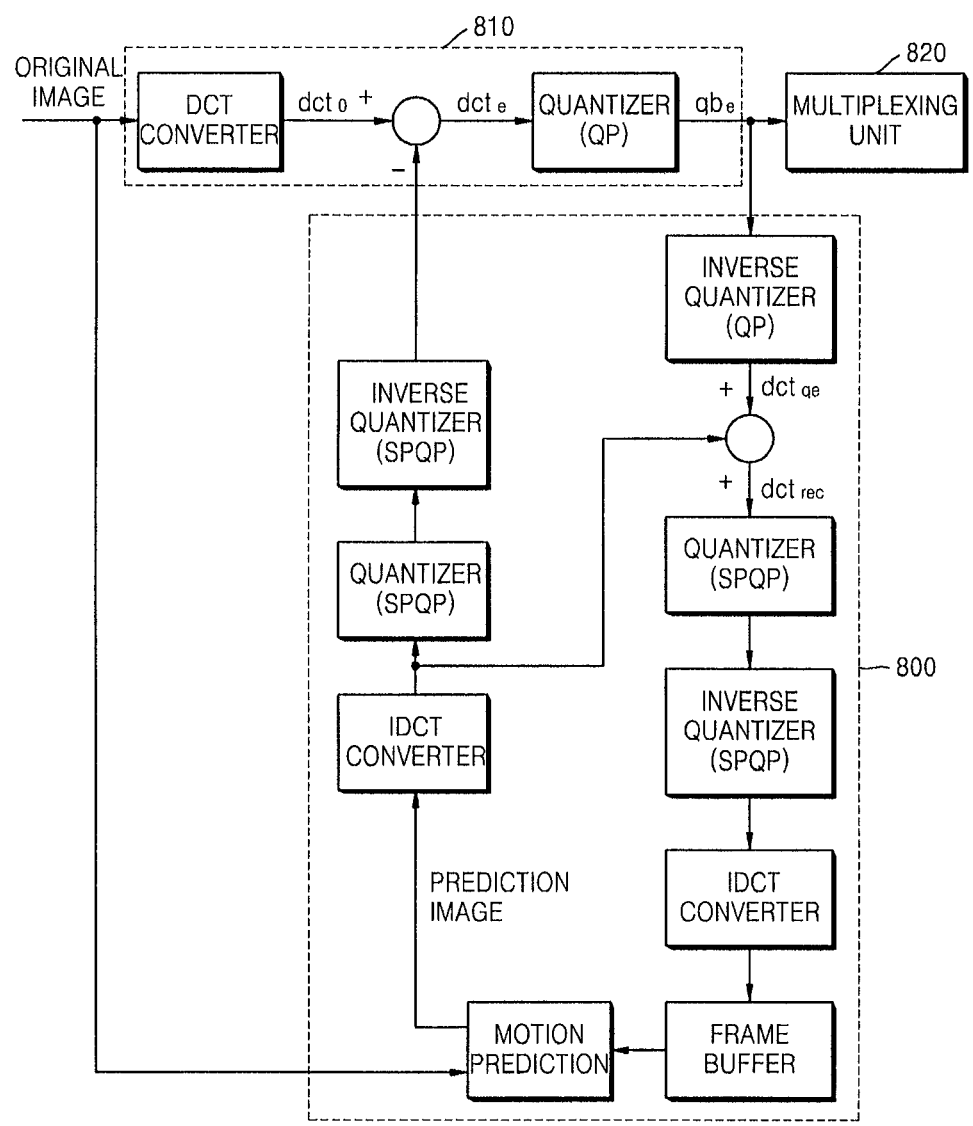
FIG. 8 is a diagram for illustrating a method of encoding a non-switching picture, according to conventional H.264 video standards.

FIG. 8 is a diagram for illustrating a method of encoding a non-switching picture, according to conventional H.264 video standards.

Referring to FIG. 8, a non-switching picture encoding unit includes a motion prediction unit 800, an image conversion unit 810, and a multiplexing unit 820.

An I-macroblock is encoded by using a conventional I-macroblock encoding method. A non I-macroblock is encoded as below.

First, a prediction image is generated by using an original image and a decoded previous image stored in a frame buffer.

Discrete cosine transform (DCT) conversion is performed on the prediction image and the original image. Then, the prediction image is quantized and inverse quantized by SPQP parameters, thereby generating prediction DCT coefficients. The differences between the prediction DCT coefficients and DCT coefficients of the original image are input to a QP quantizer and form a bitstream and the bitstream and motion vectors are output to the multiplexing unit 820.

Residual DCT coefficients output from the QP quantizer are combined with DCT coefficients of the prediction image through a QP inverse quantizer and the combined DCT coefficients are stored in the frame buffer.

Figure 9:
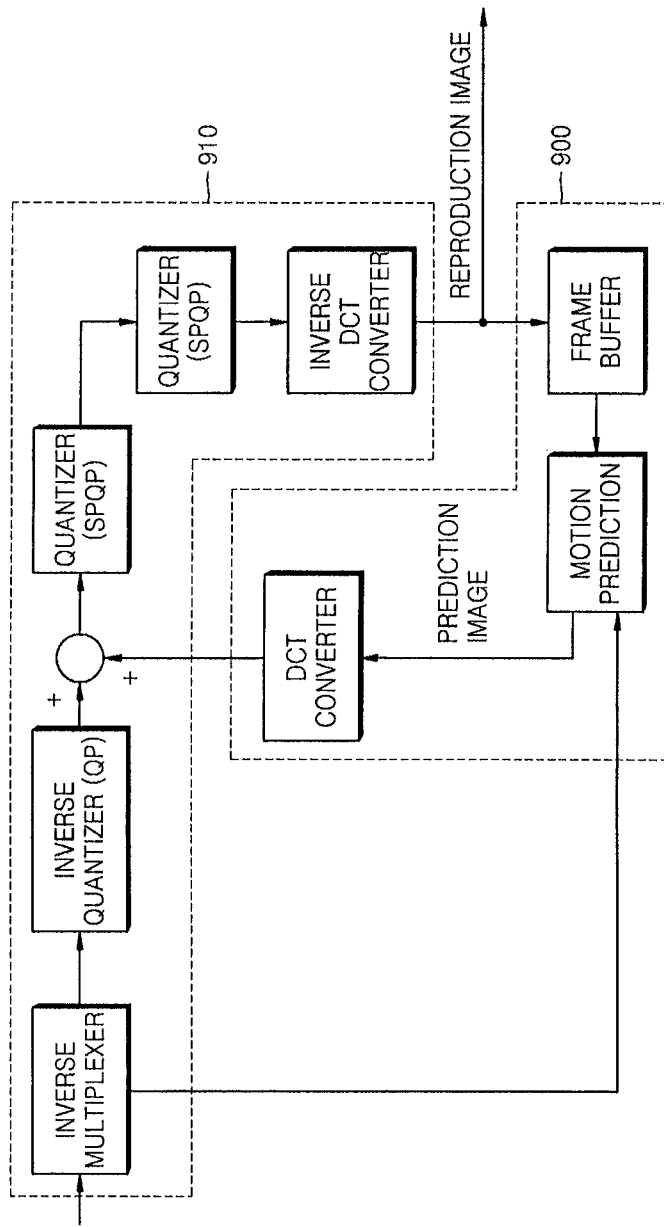
FIG. 9 is a diagram for illustrating a method of decoding the non-switching picture encoded according to conventional H.264 video standards as illustrated in FIG. 8.

FIG. 9 is a diagram for illustrating a method of decoding the non-switching picture encoded according to conventional H.264 video standards as illustrated in FIG. 8.

Referring to FIG. 9, a non-switching picture decoding unit includes a motion compensation unit 900 and an image reproduction unit 910.

The method illustrated in FIG. 9 is performed in reverse order of the method illustrated in FIG. 8.

Figure 10:
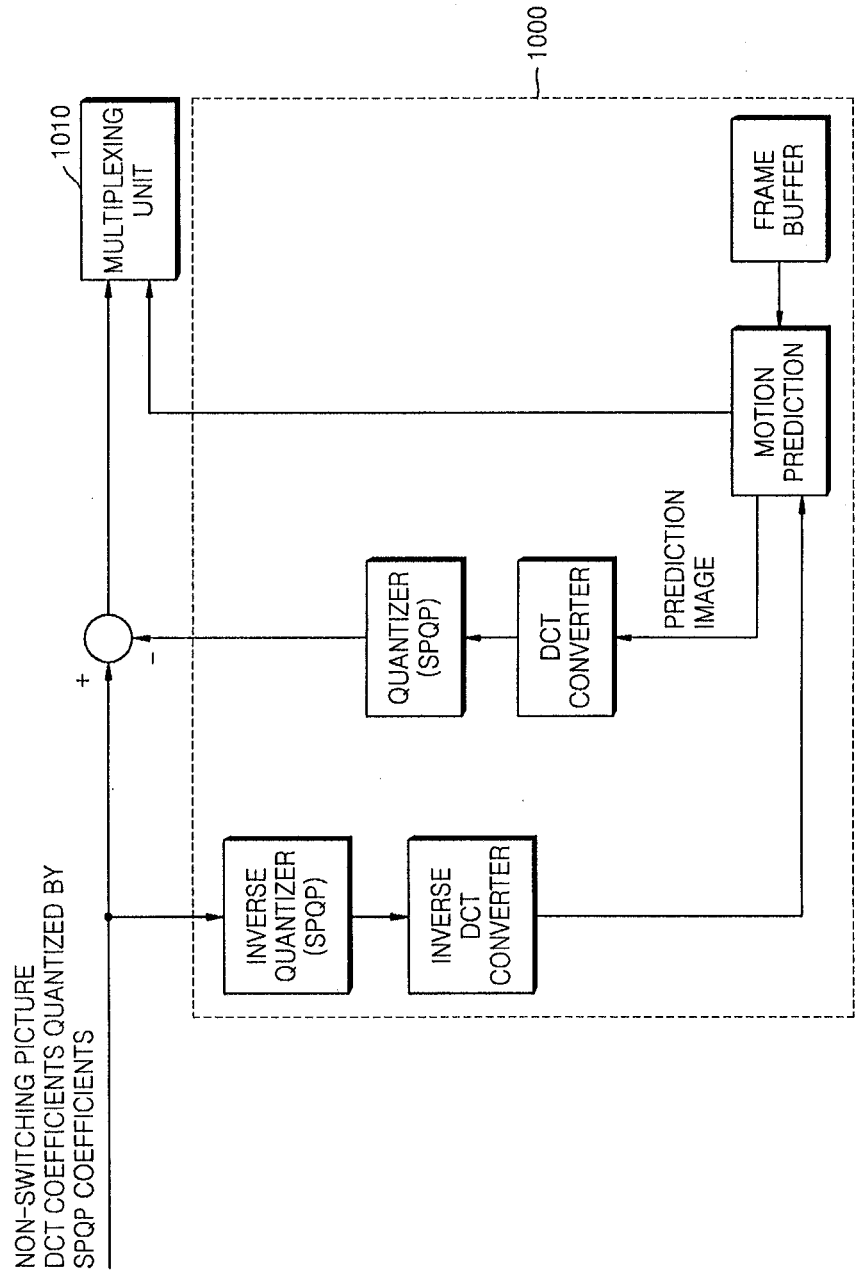
FIG. 10 is a diagram for illustrating a method of encoding a switching picture, according to conventional H.264 video standards.

FIG. 10 is a diagram for illustrating a method of encoding a switching picture, according to conventional H.264 video standards.

Referring to FIG. 10, a switching picture encoding unit includes a motion prediction unit 1000 and a multiplexing unit 1010.

A decoded image of a non-switching picture is represented as DCT coefficients quantized by SPQP quantization parameters.

The DCT coefficients quantized by the SPQP quantization parameters of the non-switching picture generate the decoded image through an inverse quantizer and an inverse DCT converter. The decoded image is motion compensated by using a reference image stored in a frame buffer, thereby generating a prediction image.

The prediction image passes through a DCT converter and is quantized by SPQP coefficients. Difference coefficients between the quantized SPQP coefficients of the prediction image and the DCT coefficients quantized by the SPQP quantization parameters of the input non-switching picture are encoded and output to the multiplexing unit 1010.

Figure 11:
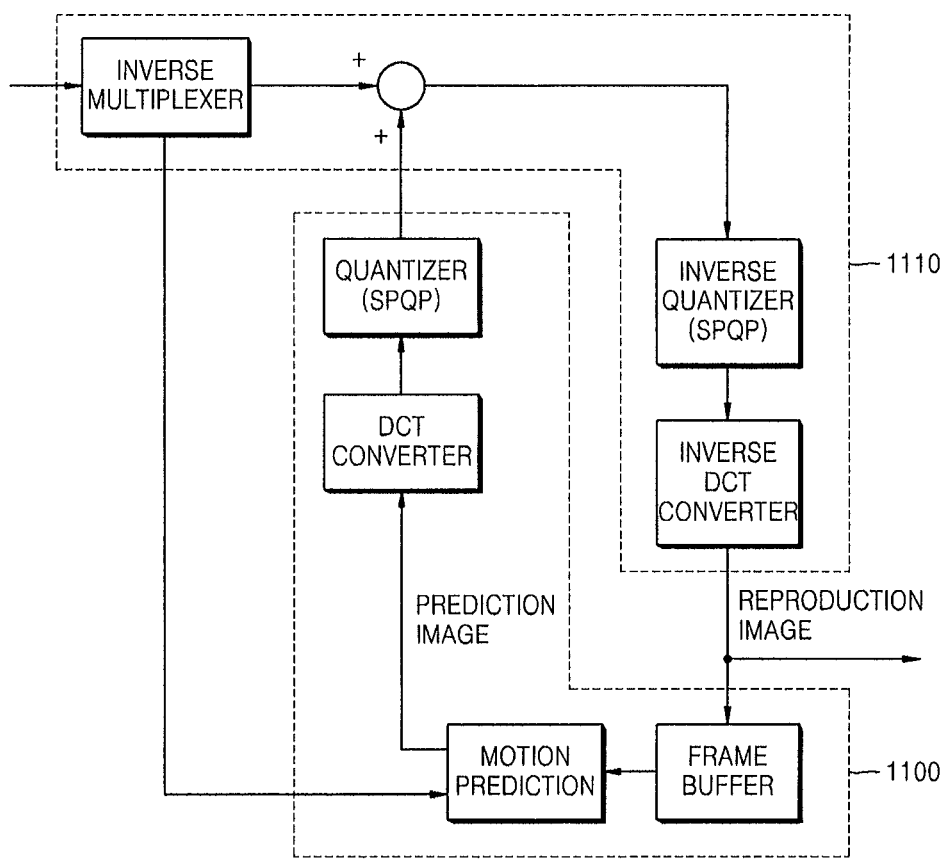
FIG. 11 is a diagram for illustrating a method of decoding the switching picture encoded according to conventional H.264 video standards as illustrated in FIG. 10.

FIG. 11 is a diagram for illustrating a method of decoding the switching picture encoded according to conventional H.264 video standards as illustrated in FIG. 10.

Referring to FIG. 11, a switching picture decoding unit includes a motion compensation unit 1100 and an image reproduction unit 1110.

A prediction image is generated by using the frame buffer and motion vectors and the prediction image is DCT converted and is quantized by SPQP coefficients.

The quantized coefficients are included to DCT coefficients quantized by the SPQP coefficients and input from an inverse multiplexer and thereby generating DCT coefficients of a decoded image quantized by the SPQP coefficients. The DCT coefficients of the decoded image quantized by the SPQP coefficients are inverse quantized by the SPQP coefficients and inverse DCT converted and thereby reproducing the image.

According to the above-described method, switching and non-switching pictures are encoded and decoded by using a reference image.

Figure 12:
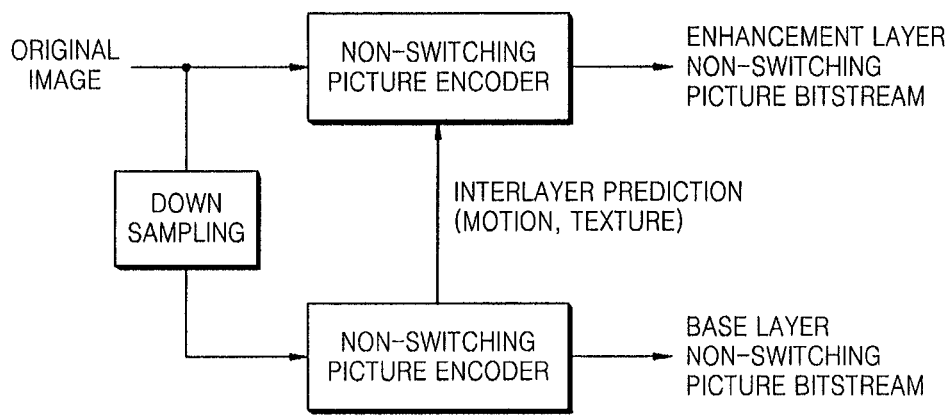
FIG. 12 is a diagram for illustrating a method of encoding a bitstream which includes a non-switching picture and in which a SVC technology is adopted, according to an embodiment of the present invention.

FIG. 12 is a diagram for illustrating a method of encoding a bitstream which includes a non-switching picture and in which a SVC technology is adopted, according to an embodiment of the present invention.

A method of encoding a non-switching picture of a base layer follows H.264 video standards.

An original image is down-sampled and is input to a base layer non-switching picture encoder, thereby generating a base layer non-switching picture bitstream.

The original image is also input to an enhancement layer non-switching picture encoder, thereby generating an enhancement layer non-switching picture bitstream.

Here, in the enhancement layer non-switching picture encoder, an encoded and decoded picture of the base layer may be used as a reference image in order to generate a prediction image by an interlayer prediction.

Alternatively, in the enhancement layer non-switching picture encoder, an encoded and decoded picture of the enhancement layer may be used as a reference image in order to generate a prediction image by motion prediction.

Figure 13:
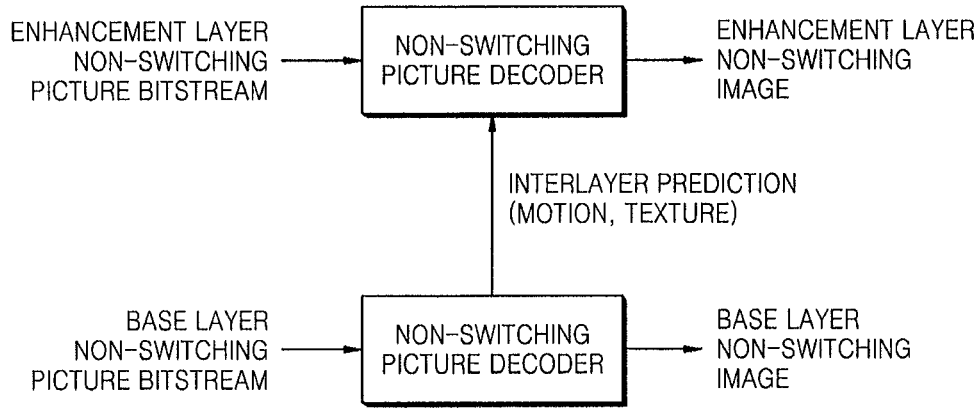
FIG. 13 is a diagram for illustrating a method of decoding a bitstream which includes a non-switching picture and in which a SVC technology is adopted, according to an embodiment of the present invention.

FIG. 13 is a diagram for illustrating a method of decoding a bitstream which includes a non-switching picture and in which a SVC technology is adopted, according to an embodiment of the present invention.

An enhancement layer non-switching picture decoder receives an enhancement layer non-switching picture bitstream and decodes a non-switching picture by using the same prediction method used when the non-switching picture has been encoded and by using a decoded base layer picture or enhancement layer picture used when an enhancement non-switching picture has been encoded as a reference image, according to conventional H.264 video standards.

Figure 14:
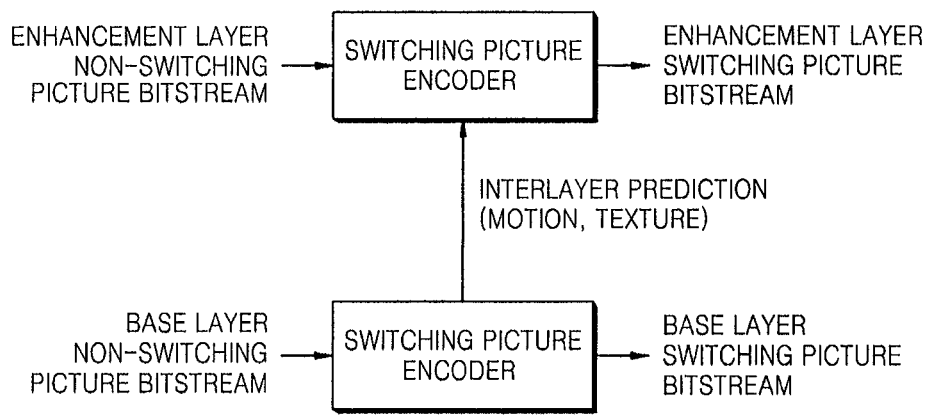
FIG. 14 is a diagram for illustrating a method of encoding a bitstream which includes a switching picture and in which a SVC technology is adopted, according to an embodiment of the present invention.

FIG. 14 is a diagram for illustrating a method of encoding a bitstream which includes a switching picture and in which a SVC technology is adopted, according to an embodiment of the present invention.

A base layer non-switching picture composed of DCT coefficients quantized by SPQP quantization coefficients according to conventional H.264 video standards is input to a base layer switching picture encoder and is predicted using an encoded and decoded image of a frame buffer as a reference image such that a switching picture is generated and encoded.

An enhancement layer non-switching picture quantized by SPQP quantization coefficients is input to an enhancement layer switching picture encoder and is generated into a prediction image by an interlayer prediction using an encoded and decoded image of the base layer frame buffer as a reference image such that a switching picture is generated. In this case, other processes except for the generation of the prediction image follow H.264 standards.

Here, the reference image used for the enhancement layer switching picture encoder is different from the reference image that was used to encode a non-switching picture.

Figure 15:
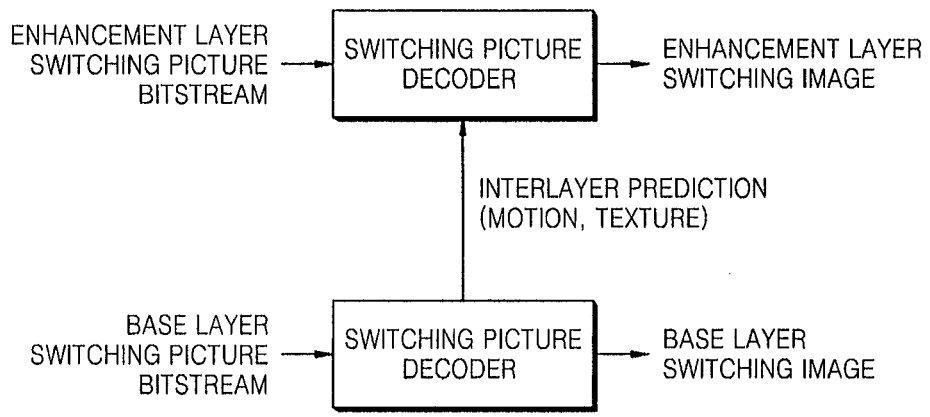
FIG. 15 is a diagram for illustrating a method of decoding a bitstream which includes a switching picture and in which a SVC technology is adopted, according to an embodiment of the present invention.

FIG. 15 is a diagram for illustrating a method of decoding a bitstream which includes a switching picture and in which a SVC technology is adopted, according to an embodiment of the present invention.

A switching picture stream including DCT coefficients quantized by SPQP quantization coefficients is input to a base layer switching picture decoder according to H.264 video standards and decodes a base layer switching picture.

A switching picture bitstream, which is encoded from a prediction image generated by an interlayer prediction using an encoded and decoded image of a base layer frame buffer as a reference image, is input to an enhancement layer switching picture decoder and is generated into an enhancement layer switching picture.

Here, the reference image used for the enhancement layer switching picture decoder is different from the reference image that was used to encode an enhancement layer non-switching picture.

In this case, the enhancement layer switching picture decoder uses a prediction image predicted by an interlayer prediction using an encoded and decoded image of a base layer which is used when an enhancement layer switching picture is encoded as a reference image, according to conventional H.264 standards.

Figure 16:
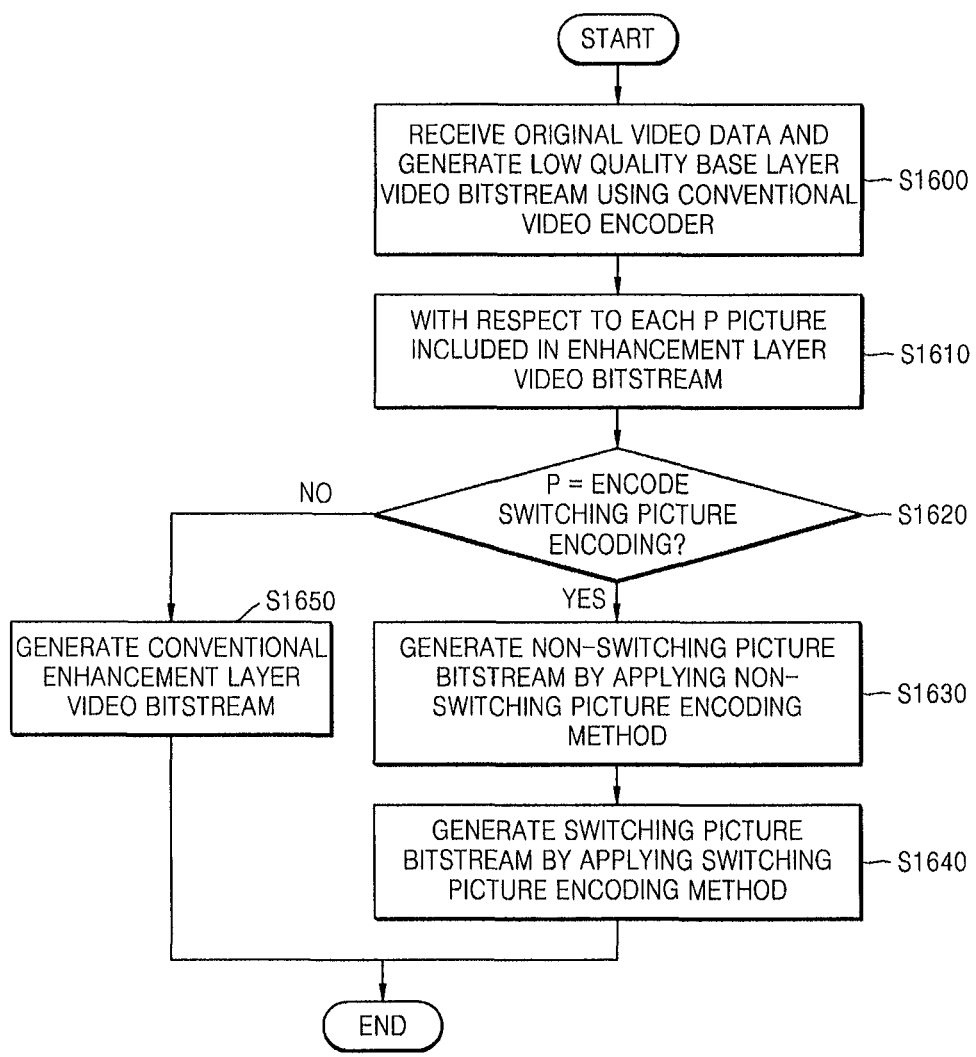
FIG. 16 is a flowchart illustrating a method of encoding an enhancement layer bitstream in which a SVC technology is adopted, according to an embodiment of the present invention.

FIG. 16 is a flowchart illustrating a method of encoding an enhancement layer bitstream in which a SVC technology is adopted, according to an embodiment of the present invention.

Original video data is input and low quality video data created by, for example, down-sampling is generated into a base layer video bitstream by using a conventional video encoder in S1600.

Whether to encode each picture P included in an enhancement layer video data into a switching picture or not is determined in S1610 and S1620.

If it is determined that a picture P is not to be encoded into a switching picture, the enhancement layer is encoded by using a conventional video encoding method so as to generate an image bitstream in S1650.

If it is determined that a picture P is to be encoded into a switching picture, the picture P is generated into a non-switching picture bitstream by using a non-switching picture encoding method in S1630.

The non-switching picture is generated into a switching picture bitstream by using a switching picture encoding method in S1640.

Figure 17:
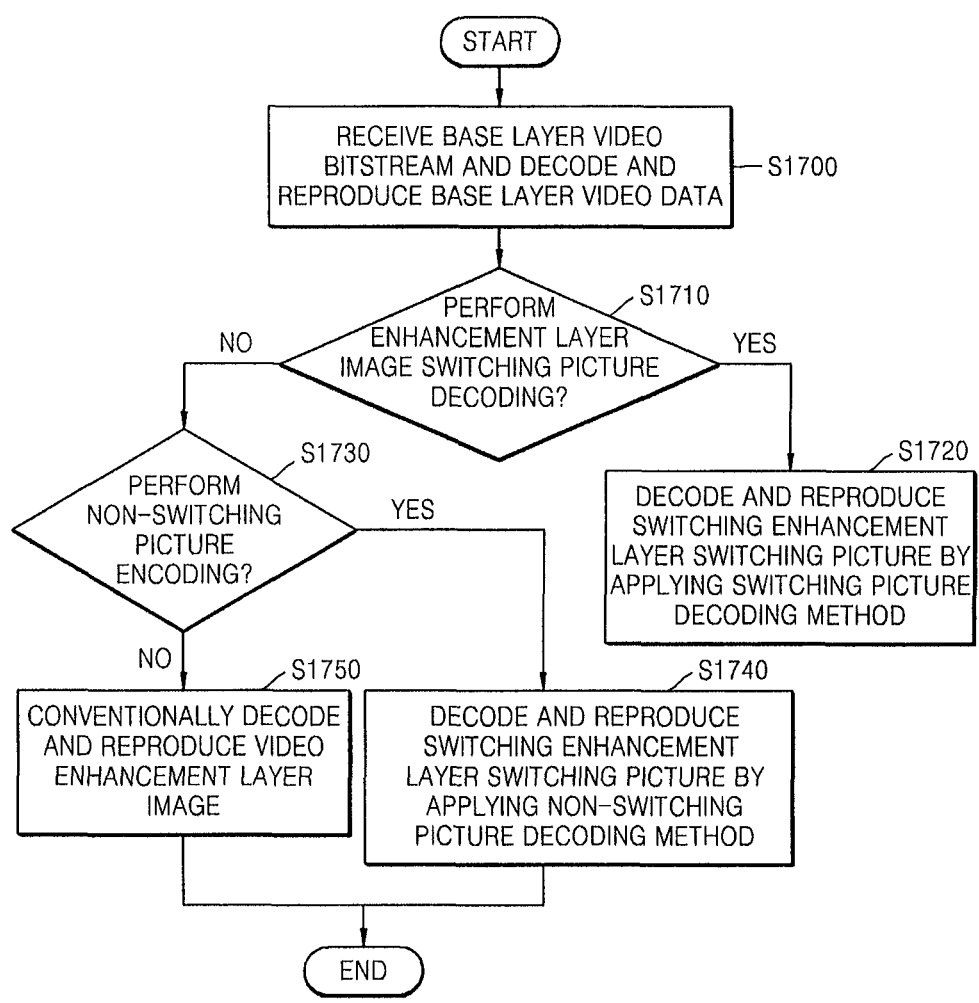
FIG. 17 is a flowchart illustrating a method of decoding a bitstream in which a SVC technology is adopted, according to an embodiment of the present invention.

FIG. 17 is a flowchart illustrating a method of decoding a bitstream in which a SVC technology is adopted, according to an embodiment of the present invention.

A base layer video bitstream is input and base layer images are decoded and reproduced by using a base layer video decoding method in S1700.

Whether to decode a switching picture of an enhancement layer or not is determined by, for example, a user's selection in S1710.

If it is determined that the switching picture of the enhancement layer is not to be decoded, whether the next enhancement layer image to be decoded is a non-switching picture or not is determined in S1730.

If it is determined that the next enhancement layer image to be decoded is not a non-switching picture, the enhancement layer image is decoded and reproduced by using a conventional video enhancement layer image decoding method in S1750.

If it is determined that the next enhancement layer image to be decoded is a non-switching picture, the enhancement layer image is decoded and reproduced by using a non-switching picture decoding method in S1740.

If it is determined that the switching picture of the enhancement layer is to be decoded, a base layer picture used as a reference image when the enhancement layer has been encoded is decoded and the switching picture of the enhancement layer is decoded and reproduced by using a switching picture decoding method in S1720.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. A method for encoding a video bitstream, the method comprises:
receiving an original image;
compressing the original image;
outputting the received and compressed original image as at least one of a high quality bitstream and a low quality bitstream,
wherein the high quality bitstream comprises an enhancement layer bitstream, and
wherein the low quality bitstream comprises a base layer bitstream;
using scalable video coding technology to generate the base layer bitstream and the enhancement layer bitstream from the received and compressed original image,
wherein an enhancement layer picture of the enhancement layer bitstream is encoded into switching picture and non-switching picture,
wherein a switching picture, which represents the same decoded image as the non-switching picture, is encoded by interlayer prediction,
wherein, during reproduction of the base layer picture of the base layer bitstream, the enhancement layer picture is configured to be able to be reproduced consecutively after anyone of the reproduced base layer pictures,
wherein each of the base layer bitstream and the enhancement layer bitstream only comprises at least one of I frames, which is an intra-coded picture, and P frames,
wherein the I frame is the first frame of each of the base layer bitstream and the enhancement layer bitstream,
wherein the P frame follows the I frame, and
wherein the P frame holds only changes from the previous frame,
wherein each of the base layer bitstream and the enhancement layer bitstream have at least two or more P frames,
wherein after reproduction of each and everyone one of the P frames of the base layer bitstream, a user is able to watch what would be a next P frame of the base layer bitstream as the P frame of the enhancement layer bitstream without having to reproduce any previous P frames of the enhancement layer bitstream,
wherein the user selects what would be the next P frame of the base layer bitstream as the P frame of the enhancement layer bitstream, and
wherein a next P frame of the enhancement layer bitstream is decoded with reference to the switching picture.

2. The method of claim 1, wherein the non-switching picture is encoded by prediction using an original image and a reference image generated by decoding a pre-encoded base layer picture and a pre-encoded enhancement layer picture, and the switching picture is encoded by interlayer prediction using a reference image generated by decoding a pre-encoded base layer picture.

3. The method of claim 2, wherein the reference image used for the prediction when the switching picture is encoded is different from the reference image used for the prediction when the non-switching picture is encoded.

4. A method of encoding, the method comprising:
a non-switching picture in which a base layer bitstream and an enhancement layer bitstream are encoded for interlayer reproduction conversion of an original image to be encoded, wherein the non-switching picture is encoded by prediction using an original image and a reference image generated by decoding a pre-encoded base layer picture and a pre-encoded enhancement layer picture,
wherein each of the base layer bitstream and the enhancement layer bitstream only comprises at least one of I frames, which is an intra-coded picture, and P frames, which is a forward predicted picture,
wherein at least two or more of the P frames follow the I frame,
wherein each of the two or more P frames in the enhancement layer bitstream represent a unique picture based on a high quality video bitstream,
wherein when each of the two or more P frames in the enhancement layer bitstream representing the unique picture based on the high quality bitstream the same unique picture is represented by the respective P frames in the base layer bitstream as a low quality video bitstream,
wherein each of the at least two or more P frame of the base layer bitstream and the enhancement layer bitstream represents a unique picture,
wherein each of the two more P frames of the enhancement layer bitstream represents the respective unique picture in a high quality bitstream,
wherein each of the two more P frames of the base layer bitstream represents the respective unique picture in a low quality bitstream,
wherein after reproduction of the unique picture from each and every one of the P frames of the base layer bitstream, a user is able to watch what would be a next P frame of the base layer bitstream as the P frame of the enhancement layer bitstream without having to reproduce any previous P frames of the enhancement layer bitstream, wherein the user selects what would be the next P frame of the base layer bitstream as the P frame of the enhancement layer bitstream, and wherein a next P frame of the enhancement layer bitstream is decoded with reference to the switching picture.

5. The method of claim 4, comprising (a) encoding the non-switching picture by prediction using a reference image generated by decoding a pre-encoded base layer picture or a pre-encoded enhancement layer picture.

6. The method of claim 5, wherein operation (a) comprises:

generating prediction information and a prediction image by using the original image, and the reference image generated by decoding a pre-encoded base layer picture or a pre-encoded enhancement layer picture;

generating a bitstream by compressing a residual image which corresponds to the difference between the original image and the prediction image; and combining and outputting a bitstream generated by the image conversion unit and the prediction information.

7. A method of encoding, the method comprising:

a switching picture, in which a base layer bitstream and an enhancement layer bitstream are generated for interlayer reproduction conversion of an original image to be encoded by using the base layer bitstream and the enhancement layer bitstream which comprises a non-switching picture, wherein a switching picture, which represents the same decoded image as the non-switching picture, is encoded by interlayer prediction using the non-switching picture and a reference image generated by decoding a pre-encoded base layer picture, wherein each of the base layer bitstream and the enhancement layer bitstream only comprises at least one of I frames, which is an intra-coded picture, and a plurality of P frames, wherein the I frame is the first frame of each of the base layer bitstream and the enhancement layer bitstream, wherein the P frame follows the I frame, wherein the P frame holds only changes from the previous frame, and wherein at least two or more of the P frames follow the I frame, wherein the switching picture is separate and distinct from the base layer bitstream, wherein after reproduction of each and every one of the P frames from the base layer bitstream, a user is able to watch what would be a next P frame of the base layer bitstream as the P frame of the enhancement layer bitstream without having to reproduce any previous P frames of the enhancement layer bitstream, and wherein the user selects what would be the next P frame of the base layer bitstream as the P frame of the enhancement layer bitstream, and wherein a next P frame of the enhancement layer bitstream is decoded with reference to the switching picture.

8. The method of claim 7, comprising (b) encoding the switching picture which represents the same decoded image as the non-switching picture in accordance with the interlayer prediction using the base layer picture.

9. The method of claim 8, wherein operation (b) comprises:

generating prediction information and a prediction image by interlayer prediction using the non-switching picture, and the reference image generated by decoding a pre-encoded base layer picture;

compressing a residual image which corresponds to the difference between the non-switching picture and the prediction information; and combining and outputting image information generated by the image conversion unit and the prediction information.

10. A method of encoding, the method comprising:

a base layer bitstream and an enhancement layer bitstream for interlayer reproduction conversion of an original image to be encoded, the method comprising encoding the non-switching picture by prediction using an original image and a reference image generated by decoding a pre-encoded base layer picture and a pre-encoded enhancement layer picture, wherein each of the base layer bitstream and the enhancement layer bitstream only comprises at least one of I frames, which is an intra-coded picture, and P frames, wherein the I frame is the first frame of each of the base layer bitstream and the enhancement layer bitstream, wherein the plurality of P frames follow the I frame, and wherein each of the plurality of P frames hold only changes from the previous frame, wherein after reproduction of each and every one of the P frames from the pre-encoded base layer picture of the base layer bitstream, a user is able to watch what would be a next P frame of the base layer bitstream as the P frame of the enhancement layer bitstream without having to reproduce any previous P frames of the enhancement layer bitstream, wherein the user selects what would be the next P frame of the base layer bitstream as the P frame of the enhancement layer bitstream, and wherein a next P frame of the enhancement layer bitstream is decoded with reference to the switching picture.

11. The method of claim 10, wherein the encoding of the non-switching picture comprises (a) encoding the non-switching picture by prediction using a reference image generated by decoding a pre-encoded base layer picture or a pre-encoded enhancement layer picture.

12. The method of claim 11, wherein operation (a) comprises:

generating prediction information and a prediction image by using the original image, and the reference image generated by decoding a pre-encoded base layer picture or a pre-encoded enhancement layer picture;

generating a bitstream by compressing a residual image which corresponds to the difference between the original image and the prediction image; and combining and outputting a bitstream generated by the image conversion unit and the prediction information.

13. The method of claim 10, further comprising encoding a switching picture, which represents the same decoded image as the non-switching picture, by interlayer prediction using the non-switching picture and a reference image generated by decoding a pre-encoded base layer picture.

14. The method of claim 13, wherein the encoding of the switching picture comprises (b) encoding the switching picture which represents the same decoded image as the non-switching picture in accordance with the interlayer prediction using the base layer picture.

15. The method of claim 14, wherein operation (b) comprises:

generating prediction information and a prediction image by an interlayer prediction using the non-switching picture, and the reference image generated by decoding a pre-encoded base layer picture;

compressing a residual image which corresponds to the difference between the non-switching picture and the prediction information; and combining and outputting image information generated by the image conversion unit and the prediction information.

16. A method of decoding, the method comprising:

a non-switching picture by decoding a bitstream comprising switching pictures for interlayer reproduction conversion between a base layer bitstream and an enhancement layer bitstream, wherein, if an enhancement layer picture is to be reproduced while a base layer picture of a base layer bitstream is being reproduced, a non-switching picture comprised in an enhancement layer bitstream is decoded by using prediction information used when the non-switching picture was encoded, wherein each of the base layer bitstream and the enhancement layer bitstream only comprises at least one of I frames, which is an intra-coded picture, and a plurality of P frames, wherein the I frame is the first frame of each of the base layer bitstream and the enhancement layer bitstream, wherein the plurality of P frames follow the I frame, and wherein each of the plurality of P frames hold only changes from the previous frame, wherein after reproduction of each and every one of the P frames from the base layer bitstream, a user is able to watch what would be a next P frame of the base layer bitstream as the P frame of the enhancement layer bitstream without having to reproduce any previous P frames of the enhancement layer bitstream, wherein the user selects what would be the next P frame of the base layer bitstream as the P frame of the enhancement layer bitstream, and wherein a next P frame of the enhancement layer bitstream is decoded with reference to the switching picture.

17. A method of decoding, the method comprising:

a switching picture by decoding a bitstream comprising switching pictures for interlayer reproduction conversion between a base layer bitstream and an enhancement layer bitstream, wherein, if an enhancement layer picture is to be reproduced while any one of plurality of base layer pictures of a base layer bitstream is being reproduced, a switching picture comprised in an enhancement layer bitstream is decoded by using prediction information used when the switching picture was encoded, wherein each of the base layer bitstream and the enhancement layer bitstream only comprises at least one of I frames, which is an intra-coded picture, and a plurality of P frames, wherein the I frame is the first frame of each of the base layer bitstream and the enhancement layer bitstream, wherein the plurality of P frames follow the I frame, and wherein each of the plurality of P frames hold only changes from the previous frame, wherein after reproduction of each and every one of the P frames from the base layer bitstream, a user is able to watch what would be a next P frame of the base layer bitstream as the P frame of the enhancement layer bitstream without having to reproduce any previous P frames of the enhancement layer bitstream, wherein the user selects what would be the next P frame of the base layer bitstream as the P frame of the enhancement layer bitstream, and wherein a next P frame of the enhancement layer bitstream is decoded with reference to the switching picture.

18. A method of decoding, the method comprising:

a non-switching picture by decoding a bitstream comprising switching pictures for interlayer reproduction conversion between a base layer bitstream and an enhancement layer bitstream, the method comprising decoding an enhancement layer picture by using a non-switching picture included in the enhancement layer bitstream, if an enhancement layer picture is to be reproduced while a base layer picture of the base layer bitstream is being reproduced, wherein each of the base layer bitstream and the enhancement layer bitstream only comprises at least one of I frames, which is an intra-coded picture, and a plurality of P frames, wherein the I frame is the first frame of each of the base layer bitstream and the enhancement layer bitstream, wherein the plurality of P frames follow the I frame, wherein each of the plurality of P frames hold only changes from the previous frame, wherein after reproduction of each and every one of the P frames from the base layer bitstream, a user is able to watch what would be a next P frame of the base layer bitstream as the P frame of the enhancement layer bitstream without having to reproduce any previous P frames of the enhancement layer bitstream, wherein the user selects what would be the next P frame of the base layer bitstream as the P frame of the enhancement layer bitstream, and wherein a next P frame of the enhancement layer bitstream is decoded with reference to the switching picture.

19. The method of claim 18, further comprising decoding an enhancement layer picture by using a switching picture comprised in the bitstream, if the enhancement layer picture is to be reproduced while a base layer picture of the base layer bitstream is being reproduced.

* * * * *